United States Patent
Asai

(10) Patent No.: US 6,332,302 B1
(45) Date of Patent: Dec. 25, 2001

(54) IMPACT BAR AND ITS MANUFACTURING METHOD

(75) Inventor: Katsuhiko Asai, Konan (JP)

(73) Assignee: Sanyo Machine Works, Ltd., Aichi-ken (JP)

( * ) Notice: Subject to any disclaimer, the term of this patent is extended or adjusted under 35 U.S.C. 154(b) by 0 days.

(21) Appl. No.: 09/220,673

(22) Filed: Dec. 23, 1998

(51) Int. Cl.⁷ ........................................................ E04C 3/30
(52) U.S. Cl. ........................ 52/731.6; 52/732.1; 52/735.1; 296/146.6; 296/188; 138/115; 138/177
(58) Field of Search ................................ 52/731.2, 731.6, 52/732.1, 735.1; 296/146.6, 188; 49/502; 138/109, 177, 115; 29/23.1, 33 D, 897.2, 890.038, 890.053

(56) References Cited

U.S. PATENT DOCUMENTS 3,336,056 * 8/1967 Cassel et al. .
4,251,907 * 2/1981 Bleckmann et al. ................... 29/456
4,389,138 * 6/1983 Soderstrom ............................ 405/43
5,580,120 * 12/1996 Nees et al. ............................ 296/188
5,813,718 * 9/1998 Masuda et al. .................... 296/146.6
5,901,988 * 5/1999 Aihara et al. ...................... 285/288.1

* cited by examiner

Primary Examiner—Carl D. Friedman
Assistant Examiner—Yvonne M. Horton
(74) Attorney, Agent, or Firm—Arent Fox Kintner Plotkin & Kahn PLLC

(57) ABSTRACT

An impact bar having a sectional shape including a cylindrical portion formed of a plate material has a flat rib portion formed by extending both ends of the plate material to an inner side of the cylindrical portion with the leading end of each end being close to or contacting the inner surface of the cylindrical portion. The resulting impact bar provides enhanced strength without an increase in weight.

7 Claims, 3 Drawing Sheets

IMPACT BAR AND ITS MANUFACTURING METHOD

BACKGROUND OF THE INVENTION

The present invention relates to an impact bar built into an automobile door and method of manufacture.

Recently, in order to protect the driver and passenger from a side-on collision of an automobile, a pipe-shaped impact bar is incorporated into a side door. A conventional impact bar is generally made up of a steel round pipe. As shown in FIG. 5, the impact bar 20 is assembled in a space between an inner panel 23 and an outer panel 24 by welding and fixing press-formed mounting members 21, 22 to both ends of the impact bar 20, as shown in FIG. 4. The mounting members 21, 22 are fixed to a door frame (not shown) or the like. In this space, the impact bar 20 is adhered and supported by a gumdrop 25 applied to the inner surface of the outer panel 24.

Lately, consumers have demanded higher safety in side-on collisions. In order to meet this need, the strength of the side impact bar must be further enhanced. In the conventional impact bar, however, the strength is determined by the wall thickness of the round pipe. Accordingly, the thickness of the impact bar must be increased to obtain a higher strength, which results in an increased weight of the impact bar.

Thus, it is an object of this invention to provide an impact bar having an enhanced strength against an external force from a radial direction while suppressing any weight increase.

SUMMARY OF THE INVENTION

To achieve the object, the impact bar of the invention comprises a cylindrical portion formed of a plate material in a cylindrical form, and a flat rib portion formed by extending and mutually overlaying both ends of the plate material to an inner side of the cylindrical portion, with a leading end close to or in contact with the inner surface of the cylindrical portion.

The strength is further increased by fixing the leading end of the rib portion and the cylindrical portion by laser welding.

The impact is manufactured by forming a pipe member by folding both end of a plate member in a same direction to form raised parts. A plate material is rolled between both raised parts in a cylindrical form with the raised parts inside and overlaying the raised parts mutually so that the leading end of the raised parts are closed to or contacted with the inner surface of the cylindrical portion. The cylindrical portion of the pipe member and the leading end of the raised parts are then fixed by laser welding.

DESCRIPTION OF THE PREFERRED EMBODIMENT

A preferred embodiment of the invention is describe portioned below while referring to FIG. 1 to FIG. 5.

Figure 1:
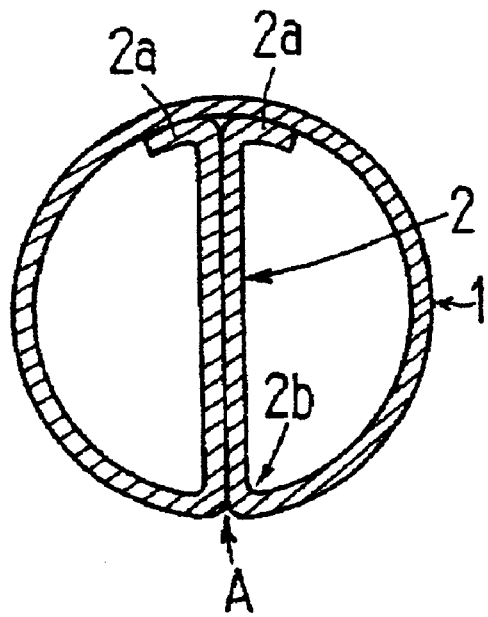
FIG. 1 is a sectional view, in a radial direction, illustrating an impact bar according to the invention.
Figure 2:
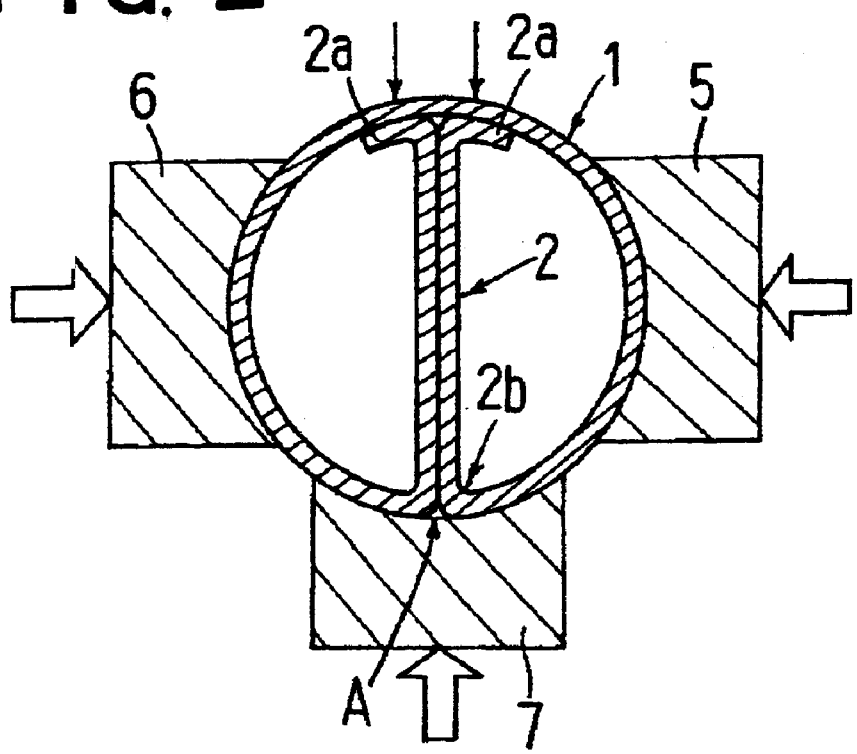
FIG. 2 is a sectional view, in a radial direction, illustrating the manufacturing process of the impact bar of FIG. 1.

As shown in FIG. 1, the impact bar of the invention includes a cylindrical portion 1 formed from a plate material having a predetermined thickness, such as, for example, approximately 2 mm. A rib portion 2 is formed by extending both ends of the plate material to an inner side of the cylindrical portion 1. Then ends are mutually overlaid an inner side of the cylindrical portion in opposite circumferential directions. The rib portion 2 is a flat plate disposed across a diameter of the cylindrical portion 1. The ends of the rib portion 2 are each a flange portion 2a that is close to or in contact with the inner side of the cylindrical portion 1 by, as described above, mutually overlaying or folding both end of the plate material 1 in opposite circumferential directions, i.e., in the direction going away from the rib portion 2. The plate material members forming the rib portion 2 are ideally adhered to each other, excluding the flange portion 2a.

The strength of the impact bar of this invention having the above described sectional shape and the round pipe of the prior art were compared by determining the coefficient of section of each, i.e., 7 supporting both ends, concentrating a load in the center, while an outside diameter of each was 35 mm. The comparison confirmed that the product of the invention achieves the maximum allowable stress, similar to that of the prior art, but at a weight of about 75% of the prior art.

Figure 5:
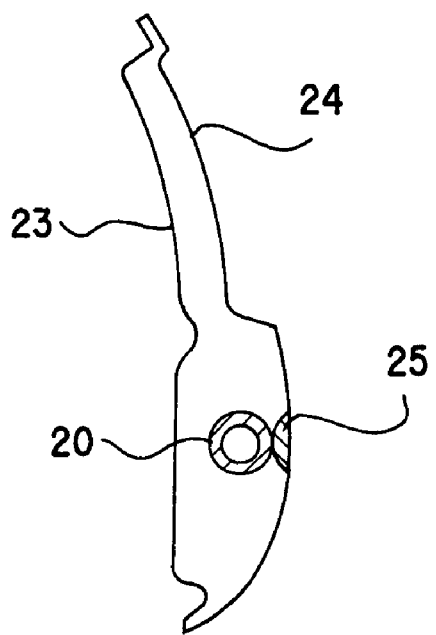
FIG. 5 is a longitudinal sectional view illustrating a mounting state of the conventional impact bar on a door.

This impact bar, same as that of the prior art, is installed, by welding and fixing mounting members 21, 22 to both ends of the impact bar (see FIG. 4) in a space between an inner panel 23 and an outer panel 24 (see FIG. 5). At this time, the impact bar is installed so that the rib portion 2 may be horizontal relative a longitudinal axis of the bar. The flange portions 2a may be directed to either the inner side or the outer side of the cylindrical portion.

To further enhance the strength of the impact bar of this invention, the leading end of the rib portion 2 and the cylindrical portion 1 may be fixed together by welding. The welding method is preferably laser welding because a deep penetration is obtained at high speed by making use of high energy density, plus the occurrence of thermal distortion at the time of welding is small, and welding from one side is possible. The laser welding is executed, for example, by a method shown in FIG. 2. The cylindrical portion 1 is supported by three jigs 5, 6, 7 disposed around the outside cylindrical surface of the cylindrical portion 1. The first and second jig 5, 6 are disposed at both sides the cylindrical portion 1 and confront plane portions of the rib portion 2, while third jig 7 is disposed at a boundary portion A and confront a base end part 2b of the rib portion 2. Laser beams (indicated by arrows) are emitted at two positions to an outer surface of the cylindrical portion 1 corresponding to the positions where the flange portions 2a are closed to or in contact with the inner surface of the cylindrical portion 1.

Figure 3A:
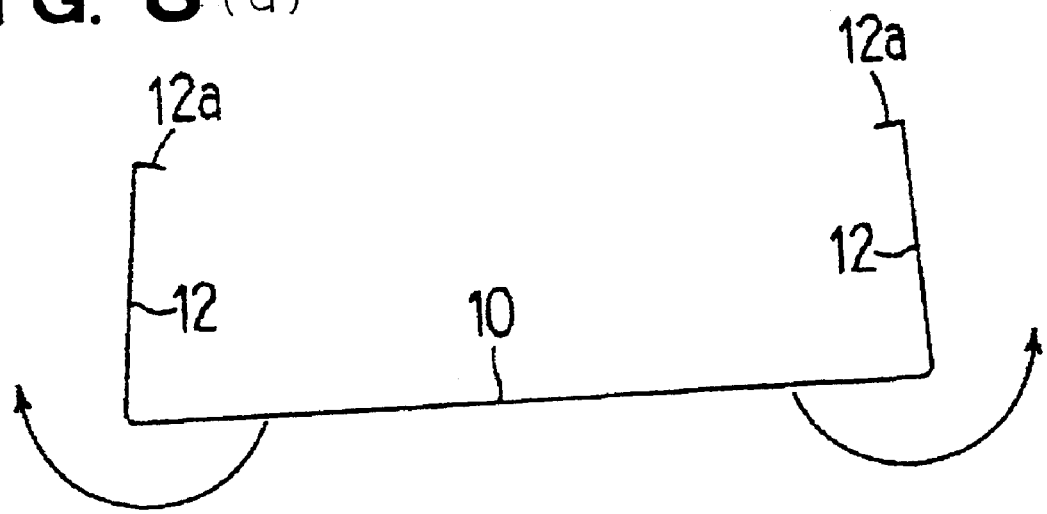
FIGS. 3a–3c are sectional views in a radial direction, that illustrate the process for welding the impact bar of FIG. 1.
Figure 3B:
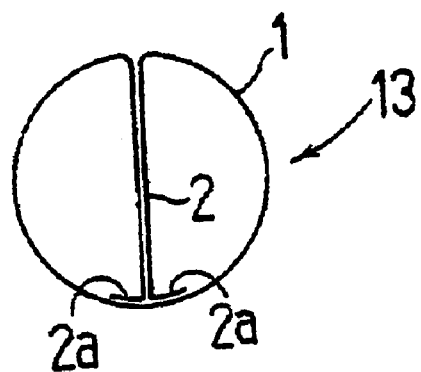
Figure 3C:
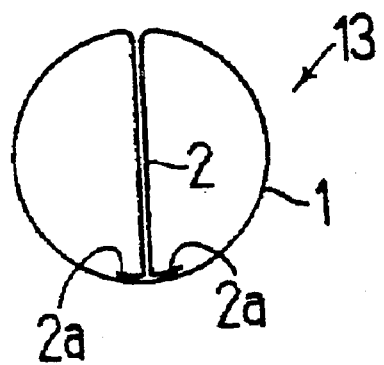
Figure 4:
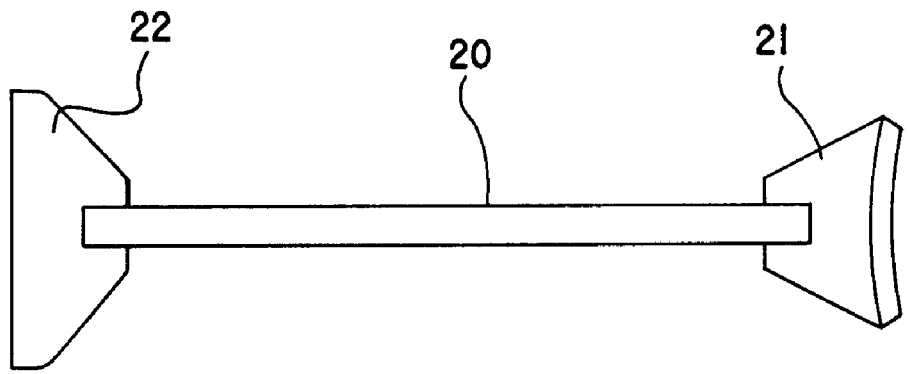
FIG. 4 is a plan view illustrating a conventional impact bar.

This impact bar can be manufactured in the following procedure, shown in FIG. 3(a), both ends in a width direction of a flat shaped piece plate material 10 are folded in a same direction, and raised parts 12 are formed At this time, a leading end of each raised part 12 is folded inward toward the other raised part 12, and a folded part 12a to be used later as a flange portion 2a is formed. Next, the plate material 10 between the raised parts 12 is rolled (the rolling direction is shown in FIG. 3(a)) keeping the raised parts 12 inside. When the raised parts 12 are joined together, a pipe member 13, as shown in FIG. 3(b), is obtained. As a result, the pipe member 13 having the cylindrical portion 1 and the flat rib portion 2 with overlaid raised parts 12, with the leading end of each raised part 12 being close to or contacting the inner side of the cylindrical portion 1 is formed. Afterwards, by fixing the cylindrical portion 1 of the pipe member 13 and the leading end (flange portion 2a ) of the rib portion 2 by laser welding as shown in FIG. 3(c) , the impact bar, as shown in FIG. 1, is manufactured.

In the foregoing description, laser welding is executed only between the leading end of the rib portion 2 and the cylindrical portion 1, but it may be executed to the boundary portion A located in its 180-degree opposite position (boundary of base end 2b of the rib portion 2 and cylindrical portion 1: see FIG. 1) from the outer side. Thus the rib portion 2 is integrated and strength of the impact bar is further enhanced.

Thus, according to the invention, while suppressing any weight increase, the strength of the impact bar, in particular, the strength against the external force in the radial direction, can be remarkably enhanced, and the safety against sidelong collision of automobile may be effectively enhanced.

What is claimed is:

1. An impact bar comprising a cylindrical portion formed from a plate material and a flat rib portion formed by extending and mutually overlapping both ends of said plate material to an inner side of the cylindrical portion such that both ends extend in opposite circumferential directions along the inner side of the cylindrical portion wherein each leading end is close to or in contact with the inner surface of the cylindrical portion.

2. An impact bar of claim 1, wherein the leading ends of the rib portion and the cylindrical portion are fixed together by laser welding.

3. The impact bar according to claim 2, wherein the laser welding is performed only between leading ends of the rib portion and cylindrical portion, thereby enhancing a strength of the impact bar against external force in a radial direction.

4. The impact bar according to claim 2, wherein the laser welding is performed at a boundary formed by abutting base ends of the rib portion and the cylindrical portion, thereby enhancing strength of the impact bar against external force in a radial direction.

5. A manufacturing method of an impact bar comprising the steps of: forming a pipe member by folding both ends of a plate member in a same direction to form raised parts, rolling the plate material between both raised parts to form a cylindrical portion with the raised parts inside the cylindrical portion, mutually overlapping both ends of the plate material to an inner side of the cylindrical portion such that both ends extend in opposite circumferential directions along the inner side of the cylindrical portion so that each leading end of the raised parts are closed to or in contact with the inner surface of the cylindrical portion and fixing the cylindrical portion of the pipe member and the leading end of the raised parts together by laser welding.

6. The manufacturing method of the impact bar according to claim 5, wherein the laser welding is performed only between leading ends of the rib portion and cylindrical portion, thereby enhancing a strength of the impact bar against external force in a radial direction.

7. The manufacturing method of the impact bar according to claim 5, wherein the laser welding is performed at a boundary formed by abutting base ends of the rib portion and the cylindrical portion, thereby enhancing strength of the impact bar against external force in a radial direction.

* * * * *